(No Model.) 2 Sheets—Sheet 1.
T. F. BAIRD.
SEED PLANTER AND CULTIVATOR.
No. 491,510. Patented Feb. 14, 1893.
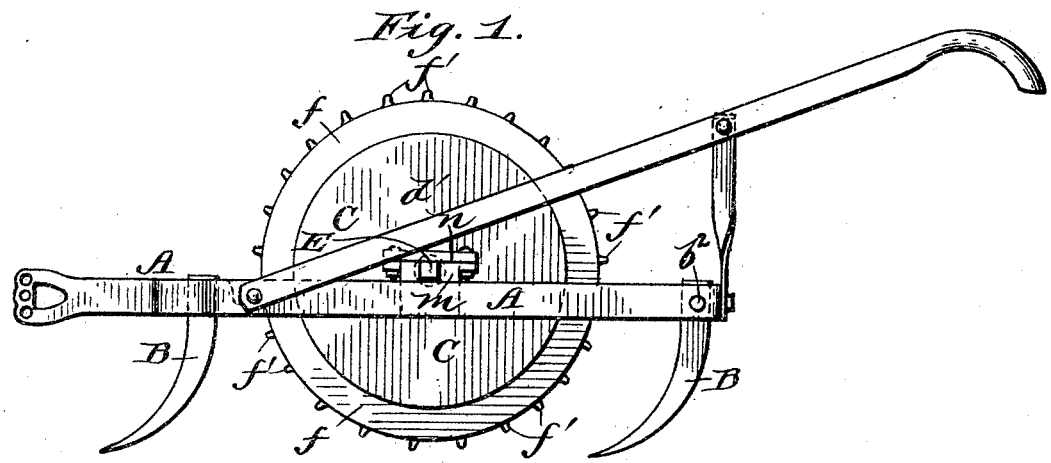
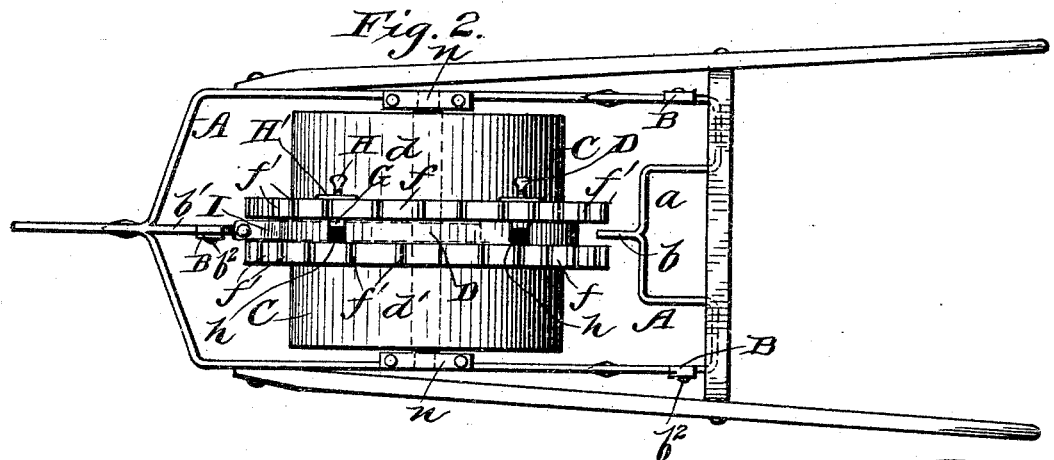
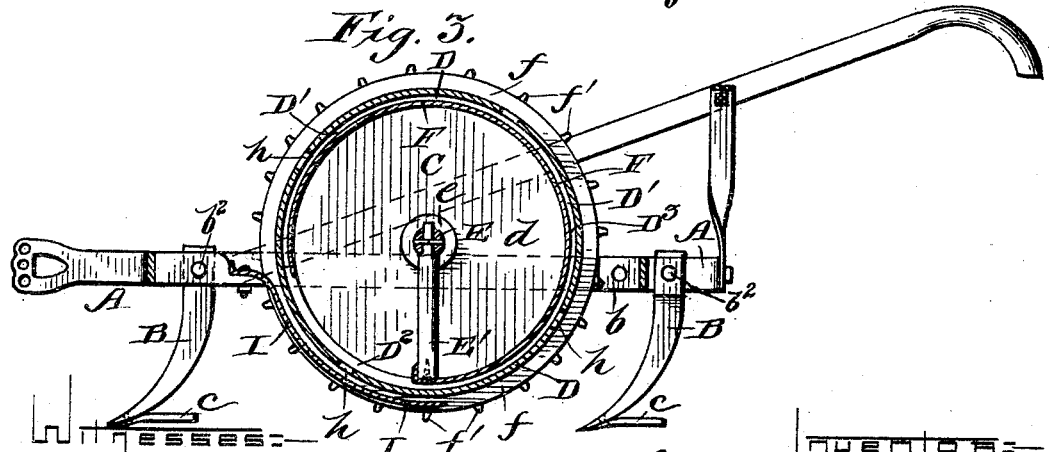

(No Model.) 2 Sheets—Sheet 2.
T. F. BAIRD.
SEED PLANTER AND CULTIVATOR.
No. 491,510. Patented Feb. 14, 1893.
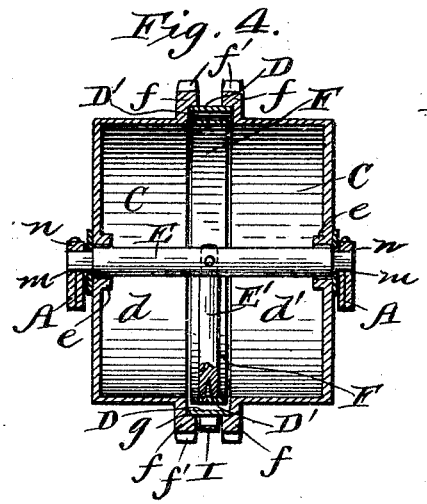
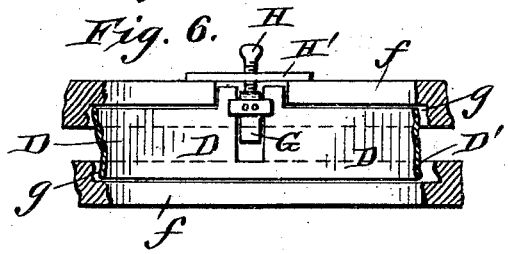
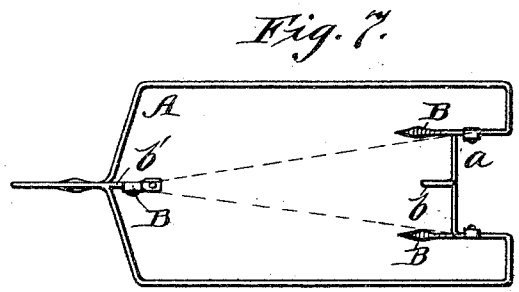
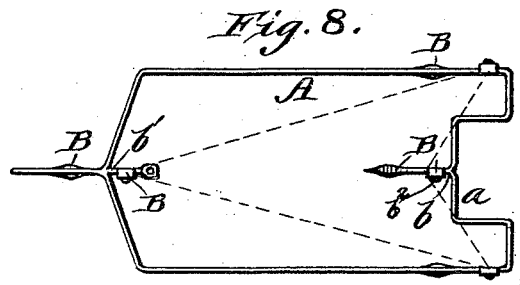
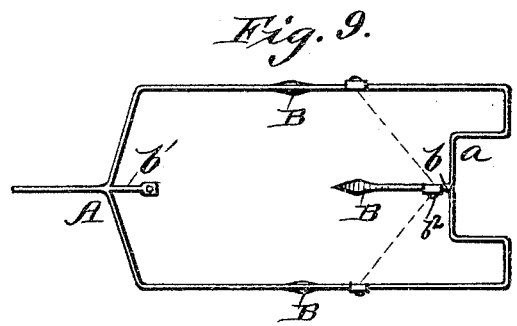
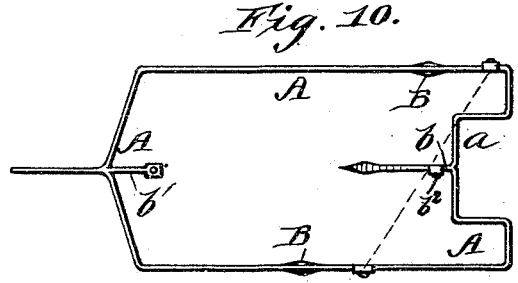
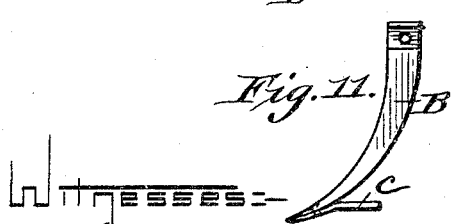
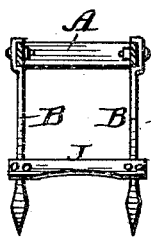

UNITED STATES PATENT OFFICE.

THOMAS F. BAIRD, OF GASBURG, VIRGINIA.

SEED PLANTER AND CULTIVATOR.

SPECIFICATION forming part of Letters Patent No. 491,510, dated February 14, 1893.

Application filed November 19, 1892. Serial No. 452,567. (No model.)

*To all whom it may concern:*

Be it known that I, THOMAS F. BAIRD, a citizen of the United States, residing at Gasburg, in the county of Brunswick and State of Virginia, have invented certain new and useful Improvements in Seed Planters and Cultivators; and I do hereby declare the following to be a full, clear, and exact description of the invention, such as will enable others skilled in the art to which it appertains to make and use the same.

My invention relates to that type of cultivating and seeding machines which comprises a supporting frame, a furrow opening, and seed covering teeth, and a hollow revolving seed hopper; and its object is to provide a simple and effective machine which can be used for cultivating the land prior to seeding, and then used for opening the furrows, dropping and covering the seed; and the kinds of seeds planted may be either corn, peanuts or cotton.

My invention will be fully understood from the following description and claims in connection with the accompanying drawings.

Figure 1 in the drawings represents a side view of my improved machine as constructed and arranged for opening the furrows, planting and covering the seed. Fig. 2 is a top view of the same; Fig. 3 a vertical longitudinal section thereof; Fig. 4 a vertical cross section of a portion of the machine, the section being taken centrally of the revolving seed hopper; Fig. 5 a broken vertical section of the hopper through one of the discharge regulating slides; Fig. 6 a broken longitudinal section of the revolving hopper; Figs. 7, 8, 9 and 10, diagrams of the cultivator frame, illustrating different arrangements of the teeth as required for different kinds of cultivation; Fig. 11 a detail side view of one of the teeth, and Fig. 12 a cross sectional view showing a clod displacing or controlling bar attached to two rear teeth.

A in the drawings represents a metallic cultivator frame of oblong form. This frame has its back bar bent forward as indicated at $a$, and a central bolting piece $b$ is provided as shown in Figs. 2, 3, 8, 9 and 10. Centrally of this bent portion a furrow closing cultivator tooth B is fastened to the bolting piece by a screw bolt $b'$, as shown in Figs. 8, 9 and 10. At the foot of this tooth a depth gaging sole-plate $c$ is applied. In some cases two covering cultivator teeth B are attached to the side pieces of the bent portion $a$, as shown in Fig. 7, and in all cases a front central furrow opening cultivator tooth B is provided and bolted to a bolting piece $b'$ of the forward cross bar of the frame. For planting, the teeth will be arranged as in Figs. 7 and 8; and for simply cultivating they may be arranged in any of the ways illustrated or other equivalent ways as deemed best; and when desired a cross shaped toothed harrow may be applied to the frame on its underside by simply removing the teeth. C represents a planting hopper constructed of two hollow spaced portions $d$ $d'$ closed at their outer and open at their inner ends, and each having a short internally bored hub $e$ at the center of its closed end. At each of the inner ends of the portions $d$ $d'$ a raised traction rim $f$ with spurs or teeth $f'$ is provided, and in the face of each of these rims a rabbet seat $g$, extending all around, is formed.

D is a metallic ring set in the rabbet seat between the portions $d$ $d'$, so as to lie outside the inner circle of said portions, and thus form a narrow seed conducting groove $D'$ all around, as shown. This ring is provided with seed discharging passages $h$, equally spaced, say four in number if corn is to be planted, and a greater or less number according to the kind of seed to be planted. This hopper is mounted so as to revolve upon a stationary axle E which has short outside journals adapted by their square form to rest in flat sided journal bearings $m$ of the frame A, and to be confined therein by removable screw cap plates $n$. To the shaft a rigid radial arm E' is fastened directly in the plane of the seed discharging passages, and to this arm a flat segmental spring plate F is fastened by one end. This plate forms the greater part of a circle and is concentric with the metallic ring D. The diameter of the circle on which the plate F is bent is considerably less than the ring D, but its inner diameter is just the same as the diameter of the inner circle of the portions of which the hopper is formed. By this construction and arrangement of the ring, a shallow channel way $D^3$ is formed in the circle of the groove $D'$, between the segmental plate and the ring D, while that portion of the groove D² which is not occupied by the plate, serves as the exit for the seed through the passages $h$, as they come in proper position for the discharge of the seed. The seed which occupies the portion D² of the groove of the hopper escapes through the passages at the bottom of the hopper, whenever said passages pass the free end of the segmental plate. The segmental plate F by being elastic yields in the event of the seed crowding into the narrow channel way formed between itself and the ring D, and thus clogging cannot occur, unless under extraordinary circumstances. The seed occupy the chamber of the hopper, and are carried around by the revolution of the hopper, and during the revolution of the hopper such seed as lie in the open portion D² of the groove are cut off by the free end of the segmental plate and compelled to discharge through the passages at the bottom of the hopper, and as the passages are always covered until they come under the portion D² of the groove, the seed cannot pass out at any other point.

For regulating the discharge of the seed, at the passages, a slide G is provided at each passage, and this slide is connected to an adjusting screw H attached to a screw tapped plate H' fastened to one of the rims of the hopper. By setting the slides inward over a passage, the quantity will be decreased, and vice versa by setting them outward. In connection with the revolving hopper an external segmental shaped seed director I is applied to the frame A so as to occupy a position below the forward half of the hopper, with a seed conducting channel way between it and the periphery of the ring D. By this arrangement, the seed as they pass out of the passages of the hopper are conducted down centrally beneath the hopper into the furrows.

In order to regulate the depth of planting the gage sole plate $c$ is attached to the cultivator teeth; and in order to remove clods or mash them, a cross bar J concaved on its underside, is fastened to the teeth when they are set in pairs as in Fig. 12.

This machine insures the planting of the seed in proper quantity and with certainty. The hopper, as usual, rolls upon the ground, and its revolution is insured by the spurs taking hold upon the same.

What I claim as my invention is:—

1. The cultivator frame having its rear bar bent inward in a forward direction, and both its front and rear bars provided with bolting plates, and its side bars formed with flat sided journal bearings, in combination with cultivator teeth and a revolving seed hopper, substantially as described.

2. The within described seed planter, comprising a supporting frame A having a furrow opening tooth, and journal bearings with flat sides, a stationary axle having a yielding segmental plate F attached to it, a revolving hollow hopper formed of portions rabbeted on their inner edges, and a perforated plate, a slide or slides arranged in relation to the seed passages, and an external seed conductor attached to the frame, substantially as described.

3. The revolving seed hopper formed with a groove, and seed discharge passages in the plane of said groove, in combination with a yielding segmental plate set in said groove and attached fast to a stationary axle, substantially as described.

4. The combination of the slides for regulating the discharge of the seed, attached to adjusting screws, with the revolving hopper having seed discharge passages, and the screw tapped plates attached to the rims of the hopper, substantially as described.

5. The hollow revolving hopper formed of two portions, each having a spurred or toothed rim, and rabbeted on its inner edge, and the two portions connected by a perforated ring plate, in combination with regulating slides, a stationary axle, stationary segmental plate, a cultivator frame having journal bearings with flat sides, and removable confining cap plates, cultivator teeth and a seed conductor, substantially as described.

In testimony whereof I hereunto affix my signature in presence of two witnesses.

THOMAS F. BAIRD.

Witnesses:
JOHN J. VINCENT,
R. S. FLOYD.